United States Patent [19]
Rabinkin

[11] Patent Number: 5,542,993
[45] Date of Patent: Aug. 6, 1996

[54] LOW MELTING NICKEL-PALLADIUM-SILICON BRAZING ALLOY

[75] Inventor: Anatol Rabinkin, Morris Plains, N.J.

[73] Assignee: AlliedSignal Inc., Morristown, N.J.

[21] Appl. No.: 417,283

[22] Filed: Apr. 5, 1995

Related U.S. Application Data

[62] Division of Ser. No. 707,206, May 23, 1991, Pat. No. 5,424,140, which is a continuation of Ser. No. 419,067, Oct. 10, 1989, abandoned.

[51] Int. Cl.⁶ ............................................. B23K 35/24
[52] U.S. Cl. ................... 148/528; 148/561; 228/262.42
[58] Field of Search .................................. 148/528, 561; 228/262.42

[56] References Cited

U.S. PATENT DOCUMENTS

| | | | |
|---|---|---|---|
| 4,508,257 | 4/1985 | Bose et al. | 228/262.42 |
| 4,802,933 | 2/1989 | Rabinkin | 148/403 |
| 5,424,140 | 6/1995 | Rabinkin | 428/606 |

*Primary Examiner*—George Wyszomierski
*Attorney, Agent, or Firm*—Ernest D. Buff; Roger H. Criss

[57] ABSTRACT

A palladium-based alloy is disclosed having a composition consisting essentially of nickel in the range of about 3 to about 30 atom percent, silicon in the range of about 15 to about 20 atom percent, the balance being palladium plus incidental impurities. The alloys of the present invention are particularly suited for joining stainless steels employed in orthodontic devices at brazing temperatures less than about 900° C.

4 Claims, No Drawings

LOW MELTING NICKEL-PALLADIUM-SILICON BRAZING ALLOY

This is a Divisional of Parent application Ser. No. 07/707,206, filed May 23, 1991 now U.S. Pat. No. 5,424,140 which, in turn is a File-Wrapper Continuation of Ser. No. 07/419,067, filed Oct. 10, 1989, now abandoned.

BACKGROUND OF THE INVENTION

This invention is directed to palladium-based alloys which consist essentially of palladium, nickel and silicon and are particularly useful for brazing stainless steels employed in orthodontic devices at low brazing temperatures. More particularly, the invention is directed to palladium alloys consisting essentially of about 3 to about 30 atom percent nickel, about 15 to about 20 atom percent silicon and the balance being essentially palladium plus incidental impurities. The alloys of the present invention have a liquidus temperatures of less than about 880° C.

Brazing is a process of joining metal parts, often of dissimilar composition, to each other. Typically, a brazing filler metal that has a melting point lower than that of the parts to be joined is interposed between the parts to form an assembly. The assembly is then heated to a temperature sufficient to melt the brazing filler metal. Upon cooling, a strong, preferably corrosion resistant, joint is formed.

Brazing filler metals comprising nickel palladium alloys have been developed which exhibit good corrosion and erosion resistance. Such alloys which have been disclosed, for example, in U.S. Pat. Nos. 4,508,257, 4,405,391 and 4,448,618. Among the alloys disclosed in the prior art, are the ternary nickel-palladium-silicon alloys disclosed in U.S. Pat. No. 4,508,257. These alloys have large concentrations of nickel and silicon and exhibit rather low liquidus temperatures. More specifically, these alloys have liquidus temperatures in the range of about 877°–948° C.

More recently, a new class of nickel palladium alloys was developed which are also substantially free of boron. These alloys, disclosed in U.S. Pat. No. 4,746,375, overcome problems associated with brazing cemented carbide parts which require brazing at low temperatures (less than about 950° C.).

Base parts of metallic orthodontic devices are comprised of thin, approximately 100 m mesh and slotted posts both of which are usually made from SAE 300 series stainless steels and are joined together by brazing. Currently, gold and silver-based alloys in either wire or powder/paste form are used as brazing filler metals in joining together these parts. The conventional gold-base alloy most frequently used is 82/18 Au—Ni (weight percent). This gold-base alloy suffers from the following deficiencies: it is very expensive to produce; it has moderate strength; it melts at above about 950° C. resulting in detrimental annealing of the thin stainless base metal parts; and, it produces joints having a yellowish color. For orthodontic devices, it is particular important that the color of the joint not contrast with the color of the stainless steel base metal parts. The result is an unfavorable appearance.

Alternatively, silver-base alloys, which are mostly used in the paste form, have been employed to braze orthodontic devices. However, silver-based alloys are prone to the formation of joint porosity which impairs joint strength and can result in joint-pit corrosion and oxidation. Moreover, the color of the joints also contrasts with the color of the stainless steel device. Further, usage of the paste form necessitates expensive cleaning of the brazed parts to remove the slag formed as a result of the decomposition of the organic binder used in the production of the paste employed as the brazing material.

An attempt was made to address the problems associated with gold and silver based brazing alloys using alloys disclosed in U.S. Pat. No. 4,508,257. Specifically, an alloy designated as MBF-1005 METGLAS® brazing foil (Allied-Signal Inc.), having a composition $Ni_{bal}Pd_{30}Si_{15}$ has been used. This alloy has a liquidus temperature in the range of about 830° to 860°, which is well below that of the gold-nickel alloys of the prior art. It forms a strong joint and has a color similar to the stainless steel. However, a limitation using this nickel-base foils is the ability to cast the foil into a ductile shape thicker than 3–4 mils (approximately 75–100 µm).

Accordingly, there is a need in the art for brazing filler materials suitable for brazing thin stainless steel parts employed in orthodontic devices which will produce high strength joint, acceptable appearance, can be used with brazing temperatures less than 900° C., and can be produced as a thick, ductile brazing product.

SUMMARY OF THE INVENTION

The present invention is directed to palladium-nickel-silicon alloys particularly useful as brazing filler metals which possess low melting temperature characteristics, low erosion and excellent corrosion properties, and which can be cast to a ductile foil form in a range of thicknesses of up to 10 mils (approximately 250 µm) or more. These alloys consist essentially of ternary palladium-nickel-silicon alloys having composition defined by the following formula: $Ni_a Si_b Pd_{bal}$ where the subscripts "a" and "b" are in atomic percent and wherein "a" is between about 3 and about 30 and "b" is between about 15 and about 20.

In addition, the invention provides brazing filler materials in the form of homogeneous ductile brazing foils or strips in thicknesses of up to 10 mils or more.

DETAILED DESCRIPTION OF THE INVENTION

In any brazing process, the brazing material must have a melting point that will be sufficiently high to provide strength to meet service requirements of the metals parts to be brazed together. However, the melting point must not be so high as to make difficult brazing operation or to adversely effect the base metal parts. Further, the material must be compatible, both chemically and metallurgically, with base metal parts being brazed. More particularly, the case of brazing of orthodontic devices, the brazing material must also provide a joint coloration which does not contrast with the base metal of the orthodontic device. Also, the brazing material must be more noble than the base metal being brazed to avoid corrosion. Ideally, the brazing material should be in the form of a foil which is homogeneous and ductile; that is, contains no binders or other materials that would otherwise form voids or contaminating residues during brazing and exhibits sufficient flexibility such that the foil can be bend to a round radius as small as about 10 times the foils thickness without fracture. And lastly, the ductile brazing foil should be available in thicknesses of at least 6 mil (≈150 µm) and up to 10 mil (≈250 µm) or more.

In accordance with the present invention, ternary palladium-nickel-silicon alloys are provided which exhibit a liquidus temperature of less than about 880° C. and are particularly suitable for brazing stainless steels employed in orthodontic devices and other applications for joining metals at temperatures lower than 900° C. The alloys of the present invention have a composition consisting essentially of about 3 to about 30 atomic percent nickel, about 15 to about 20 atom percent silicon and the balance being essentially palladium and incidental impurities. In the most preferred embodiment, the palladium-nickel-silicon alloys of the present invention have an atom fraction ratio of nickel to palladium in the range of about 1/2 to about 1/16. Palladium-nickel-silicon alloys of one most preferred embodiment exhibit liquidus temperatures of less than about 780° C. which reduces the cost associated with brazing stainless steel parts and the risk of adverse effects of heat treatment of the thin steel base metals.

In fact the melting temperature of these alloys are believed to be the lowest temperatures not only among all binary Pd—Si and ternary Ni—Pd—Si alloys but also among all Ni— and Ni—Pd-transition metal-based alloys having both silicon and boron as metalloids. In fact, the melting temperature of the most preferred alloys is slightly lower than that of Ag-41 at % Cu eutectic classical alloy.

The alloys of the present invention are ordinarily produced in the form of homogeneous, ductile foils/strips or wires by casting alloys of the above-described composition using rapid solidification techniques. More specifically, the homogenous brazing filler metals of the present invention are most preferably fabricated by a rapid solidification process which comprises forming a melt of the composition and quenching the melt on a rotating quench wheel at a rate of at least about $10^5$° C. per second. Such a process is disclosed, for example, in U.S. Pat. No. 4,142,571.

Under the above recited quenching conditions, metastable, homogeneous ductile product is obtained. The metastable product may be glassy, in which case there is no long range atomic order as evidenced by X-ray diffraction patterns which show a diffused halo, similar to that observed for inorganic oxide glasses. Generally, alloys of the present invention are at least 50% glassy and most preferably at least about 90% glassy.

Metastable products may also be a mixture of phases including Pd-based solid solution and intermetallic compounds $Pd(Ni)_xSi_y$. In the case of the alloys of the present invention, such metastable phases are not ordinarily produced under conventional processing techniques employed in the art of fabricating crystalline alloys. Accordingly, the above-described casting processes are again employed. The X-ray diffraction patterns of the solid solution alloys show sharp defraction peaks characteristic of crystalline alloys with some broadening due to production of highly desired fine grained products.

It was an unexpected discovery that foils of the alloys of the present invention produced by the rapid solidification techniques are ductile at thicknesses of at least 6 mil and up to about 10 mils or more. These products are also, generally, at least about 90% glassy.

Within the broad range of compositions of the present invention, a most preferred embodiment has been discovered which exhibits unexpectedly low liquidus temperatures. This most preferred embodiment consist of alloys having an atom fraction ratio of nickel to palladium in the range of about 1/2 to about 1/16 and further comprises silicon in the range of about 15 to about 17 atom percent. The specific advantages of these alloys include the ability to braze stainless steels at unexpectedly low temperatures while providing a brazement which exhibits no significant degradation in mechanical properties as compared to prior art alloys. The following examples illustrate the production of certain embodiments of the present invention but are not intended to limit the scope of the present invention as defined by the subjoined claims.

EXAMPLE I

Ribbons of from about 2.54 to about 25.4 mm (about 0.1 to about 1 inch) wide and about 13 to about 250 micrometers (about 0.0005 to about 0.010 inch) thickness were formed by continually depositing a melt of each of the compositions set forth in Table I, below, by overpressure of argon onto a rapidly rotating copper chill wheel (surface speed of about 3,000 to about 6,000 feet per minute). Metastable homogeneous ribbons having essentially glassy structure were produced. The liquidus and solidus temperatures of the ribbons shown in Table I, below, were determined by the Differential Thermal Analysis (DTA) technique. The individual samples were heated side by side with an inert reference material at a uniform rate, and the temperature difference between the sample and the reference material was measured as a function of temperature. A thermogram was produced (a plot of temperature change vs. temperature) from which the beginning of melting and the end of melting, known respectively as solidus and liquidus temperatures were determined. The values are reported in Table I.

TABLE I

| Alloy No. | Nominal Composition, at % | Structure | Ductility | Melting Characteristics Solidus, $T_s$, °C. | Liquidus $T_L$, °C. |
|---|---|---|---|---|---|
| 1 | $Ni_{30}Pd_{53}Si_{17}$ | amorphous | ductile | 838 | 880 |
| 2 | $Ni_{18}Pd_{65}Si_{17}$ | amorphous | ductile | 839 | 839 |
| 3 | $Ni_{10}Pd_{74}Si_{16}$ | amorphous | ductile | 773 | 779 |
| 4 | $N_5Pd_{79.5}Si_{15.5}$ | amorphous | ductile | 771 | 780 |

Alloys 3 and 4 of Table I illustrate an unexpected and particularly useful embodiment of the present invention and that these alloys exhibit an extraordinarily low liquidus temperature. Specifically, these alloys are palladium-nickel-based alloys having an atom fraction ratio of nickel to palladium of between about 1/7 and about 1/16.

I claim:

1. A process for brazing stainless steel, comprising the steps of:
    a) providing juxtaposing stainless steel parts to define a joint to be brazed;
    b) brazing said parts utilizing a homogeneous, ductile foil formed from an alloy having a composition consisting essentially of $Ni_aSi_bPd_{bal}$, where the subscripts "a" and "b" are in atomic percent and wherein the ratio of Ni to Pd is between about 1/7 and 1/16 and "b" is between about 15 and about 20, said foil having a thickness of at least about 150 μm.

2. The process of claim 1, wherein the alloy is at least about 50% glassy.

3. The process of claim 1, wherein the alloy has a liquidus of less than about 880° C.

4. The process of claim 1, wherein the foil has a thickness of at least about 250 μm.

\* \* \* \* \*